United States Patent
Fukazawa

(10) Patent No.: US 10,499,030 B2
(45) Date of Patent: Dec. 3, 2019

(54) VIDEO PROVIDING SYSTEM, VIDEO PROVIDING METHOD, AND VIDEO PROVIDING PROGRAM

(71) Applicant: Tyffon Inc., Camden, DE (US)

(72) Inventor: Ken Fukazawa, Tokyo (JP)

(73) Assignee: Tyffon Inc., Camden, DE (US)

(*) Notice: Subject to any disclaimer, the term of this patent is extended or adjusted under 35 U.S.C. 154(b) by 0 days.

(21) Appl. No.: 15/877,785

(22) Filed: Jan. 23, 2018

(65) Prior Publication Data

US 2018/0213200 A1    Jul. 26, 2018

(30) Foreign Application Priority Data

Jan. 23, 2017    (JP) ................ 2017-009801

(51) Int. Cl.
*G09B 9/00*    (2006.01)
*H04N 13/106*    (2018.01)
(Continued)

(52) U.S. Cl.
CPC ......... *H04N 13/106* (2018.05); *H04N 13/239* (2018.05); *H04N 13/257* (2018.05); *H04N 13/344* (2018.05)

(58) Field of Classification Search
CPC .. H04N 13/106; H04N 13/239; H04N 13/344; H04N 13/257
See application file for complete search history.

(56) References Cited

U.S. PATENT DOCUMENTS 6,243,055 B1* 6/2001 Fergason ............ G02B 5/3083
345/32
9,599,821 B2* 3/2017 Van Curen ......... G02B 27/0172
(Continued)

FOREIGN PATENT DOCUMENTS

JP    H 06-176131 A    6/1994
JP    H06-268943 A    9/1994
(Continued)

OTHER PUBLICATIONS

Notice of Reasons for Refusal dated Apr. 2, 2019 of counterpart Japanese Application No. 2017-009801, along with an English translation.
(Continued)

*Primary Examiner* — Howard D Brown, Jr.
(74) *Attorney, Agent, or Firm* — DLA Piper LLP (US)

(57) ABSTRACT

A video providing system includes a predetermined space surrounded by surfaces with a single color; a video display apparatus mounted on the head of a user, and including two imaging devices disposed to be separated from each other by a gap corresponding to both of human eyes and perform imaging in a front direction of the user when the user wears the video display apparatus; and a specifying device that specifies a position and a direction of the video display apparatus in the predetermined space, wherein the video display apparatus displays a video prepared in advance at a location where the single color is imaged by the two imaging devices, and displays a video based on videos captured by the two imaging devices at a location where the single color is not imaged, according to a direction and a position in the predetermined space.

6 Claims, 13 Drawing Sheets

(51) Int. Cl.
*H04N 13/257* (2018.01)
*H04N 13/344* (2018.01)
*H04N 13/239* (2018.01)

(56) References Cited

U.S. PATENT DOCUMENTS

| | | | |
|---|---|---|---|
| 2013/0083003 A1* | 4/2013 | Perez | G06F 3/005 |
| | | | 345/419 |
| 2015/0350628 A1* | 12/2015 | Sanders | G06T 15/08 |
| | | | 345/419 |
| 2016/0048203 A1* | 2/2016 | Blum | G06F 3/012 |
| | | | 104/84 |
| 2017/0140457 A1 | 5/2017 | Kaku et al. | |
| 2017/0148339 A1* | 5/2017 | Van Curen | G09B 9/003 |
| 2017/0272729 A1* | 9/2017 | Kass | G06T 15/205 |
| 2019/0113753 A1* | 4/2019 | Saur | G02B 27/01 |

FOREIGN PATENT DOCUMENTS

| | | |
|---|---|---|
| JP | H07-104718 A | 4/1995 |
| JP | H08-322064 A | 12/1996 |
| JP | H11-202256 A | 7/1999 |
| JP | 2014-072570 A | 4/2014 |
| JP | 2016-048301 A | 4/2016 |
| WO | 2014/197231 A2 | 12/2014 |
| WO | 2015/145544 A1 | 4/2017 |

OTHER PUBLICATIONS

Notice of Reasons for Refusal dated Jul. 23, 2019, of counterpart Japanese Application No. 2017-009801, along with an English translation.

Notice of Reasons for Refusal dated Oct. 21, 2019, of counterpart Japanese Application No. 2017-009801, along with an English translation.

* cited by examiner (a)

(b)

(a)

(b)

VIDEO PROVIDING SYSTEM, VIDEO PROVIDING METHOD, AND VIDEO PROVIDING PROGRAM

TECHNICAL FIELD

This disclosure relates to a display apparatus and the like used in an entertainment facility and the like.

BACKGROUND

There are amusement parks with various entertainment facilities enjoyed by many users. Such entertainment facilities include, for example, a roller coaster, a merry-go-round, and a haunted house.

JP 2016-048301 A discloses an electronic apparatus that can be used in such entertainment facilities.

In such an entertainment facility, a display apparatus may be mounted on the head of a user, and the user may enjoy the entertainment facility. However, in that case, there is a problem in that it is difficult for a user to enjoy the entertainment facility together with another user, for example, a friend. This is because a display apparatus is mounted on the head of the user, and it is difficult to recognize the friend in this state.

It could therefore be helpful to provide a display apparatus that enables a user to enjoy an entertainment facility together with other users in the entertainment facility enjoyed in a state in which the display apparatus is mounted on the head of the user.

SUMMARY

I provide a video providing system including a predetermined space surrounded by surfaces with a single color; a video display apparatus that is mounted on the head of a user and is used, and includes two imaging devices which are disposed to be separated from each other by a gap corresponding to both of the human eyes and perform imaging in a front direction of the user when the user wears the video display apparatus; and a specifying device that specifies a position and a direction of the video display apparatus in the predetermined space, in which the video display apparatus displays a video prepared in advance at a location where the single color is imaged by the two imaging devices, and displays a video based on videos captured by the two imaging devices at a location where the single color is not imaged, according to a direction and a position in the predetermined space.

I also provide a video providing method of providing a video to a video display apparatus which is mounted on the head of a user and is used in a predetermined space surrounded by surfaces with a single color, and includes two imaging devices which are disposed to be separated from each other by a gap corresponding to both of the human eyes and capture images in a front direction of the user when the user wears the video display apparatus, the method including a specifying step of specifying a position and a direction of the video display apparatus in the predetermined space; an imaging step of performing imaging in a front direction of the user with the two imaging devices; and a display step of displaying a video prepared in advance at a location where the single color is imaged by the two imaging devices, and displaying a video based on videos captured by the two imaging devices at a location where the single color is not imaged.

I further provide a video providing program for a video providing system providing a video to a video display apparatus which is mounted on the head of a user and is used in a predetermined space surrounded by surfaces with a single color, and includes two imaging devices which are disposed to be separated from each other by a gap corresponding to both of the human eyes and capture images in a front direction of the user when the user wears the video display apparatus, the program causing a computer to realize a specifying function of specifying a position and a direction of the video display apparatus in the predetermined space; an imaging function of performing imaging in a front direction of the user with the two imaging devices; and a display function of displaying a video prepared in advance at a location where the single color is imaged by the two imaging devices, and displaying a video based on videos captured by the two imaging devices at a location where the single color is not imaged.

The video providing system may further include a calculation unit that calculates a distance to an imaged object other than the single color on the basis of videos captured by the two imaging devices; and a video generation unit that generates a stereoscopic video according to the distance calculated by the calculation unit, and the video display apparatus may display the stereoscopic video generated by the video generation unit.

In the video providing system, the video generation unit may generate a video in which a differing object which is different from the object is superimposed on the object on the basis of the distance calculated by the calculation unit.

The video providing system may further include a holding tool that applies an effect to a video displayed on the video display apparatus, and is held by a user, and the video generation unit may generate a stereoscopic video to which the effect is applied according to a position and a direction of the holding tool.

The display apparatus may include an imaging unit, and, when an object other than the background in a predetermined space having the background with a single color, for example, another user is imaged, a captured video of another user can be processed and displayed, and thus it is possible to enjoy an entertainment facility together with another user.

DESCRIPTION OF REFERENCE NUMERALS AND SIGNS

Figure 1:
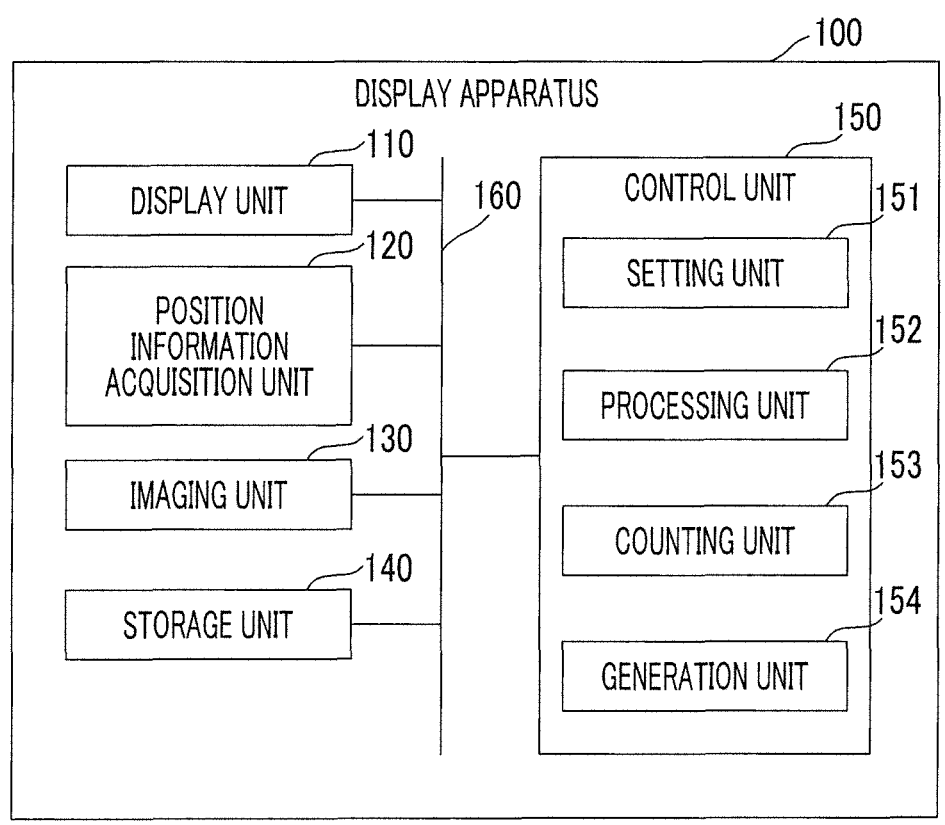
FIG. 1 is a block diagram illustrating a functional configuration example of a display apparatus.

100 DISPLAY APPARATUS
110 DISPLAY UNIT
120 POSITION INFORMATION ACQUISITION UNIT
130 IMAGING UNIT
140 STORAGE UNIT
150 CONTROL UNIT
151 SETTING UNIT
152 PROCESSING UNIT
153 COUNTING UNIT
154 GENERATION UNIT
160 BUS
170 COMMUNICATION UNIT
200 ENTERTAINMENT FACILITY
201, 202, 203, 204, AND 205 DOOR
900 DISPLAY APPARATUS
910 MANAGEMENT APPARATUS
920 COMMUNICATION UNIT
940 STORAGE UNIT
950 CONTROL UNIT

DETAILED DESCRIPTION

Hereinafter, a display apparatus according to a representative example will be described in detail with reference to the drawings.

Example 1

Configuration

A display apparatus 100 is an apparatus used in an entertainment facility 200, and worn by a user 20 to display a video. The display apparatus 100 includes at least a position information acquisition unit 120 and a display unit 110.

The position information acquisition unit 120 acquires position information indicating a position of the display apparatus in the entertainment facility. The position information acquisition unit 120 may specify a position by using, for example, an inside-out method of specifying a position or an attitude by scanning a surrounding environment with a camera or an infrared sensor attached to a head mounted display, or an outside-in method of acquiring a position or an attitude of a marker or a head mounted display by using a camera or an infrared irradiation device installed on a ceiling or a wall of a room. In addition to infrared rays, for example, position tracking using a radio frequency (RF)-based communication method using an ultra-wideband (UWB) may be employed. The position information acquisition unit 120 may be realized by a positioning system using, for example, a GPS, or may receive a beacon emitted from a beacon generator provided in the entertainment facility and acquire a position of the beacon generator included in the beacon as position information of the display apparatus.

The display unit 110 displays different videos whenever a user passes through a predetermined region included in the entertainment facility. Regarding the predetermined region, when the entertainment facility is formed of a plurality of rooms or the like, one or more rooms may be the predetermined region, and one of a plurality of regions into which the entertainment facility is virtually divided may be the predetermined region. Different videos are provided whenever a user passes through the predetermined region, and thus it is possible to provide the display apparatus 100 used in the entertainment facility enjoyed by the user several times.

Hereinafter, the display apparatus 100 will be described more in detail.

Figure 2:
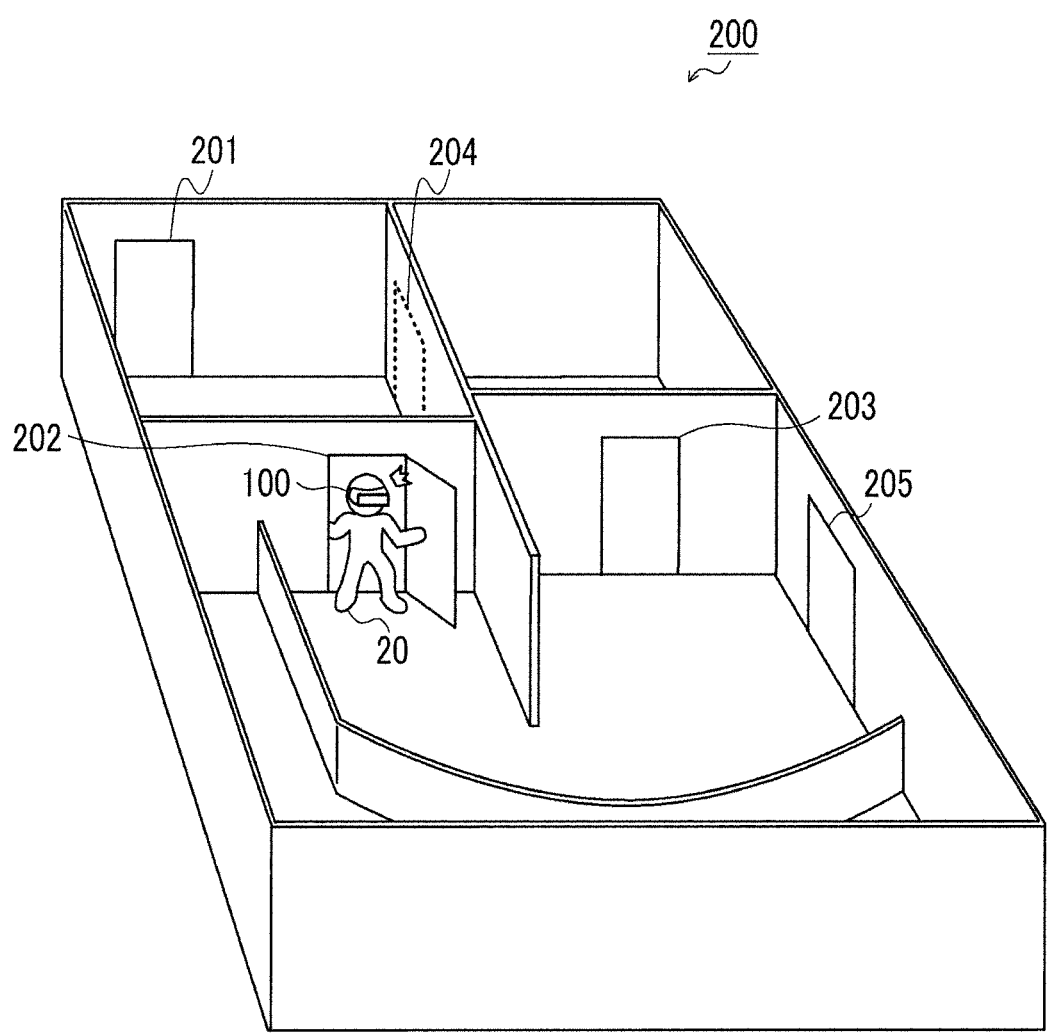
FIG. 2 is a perspective view illustrating an example of an entertainment facility.
Figure 3:
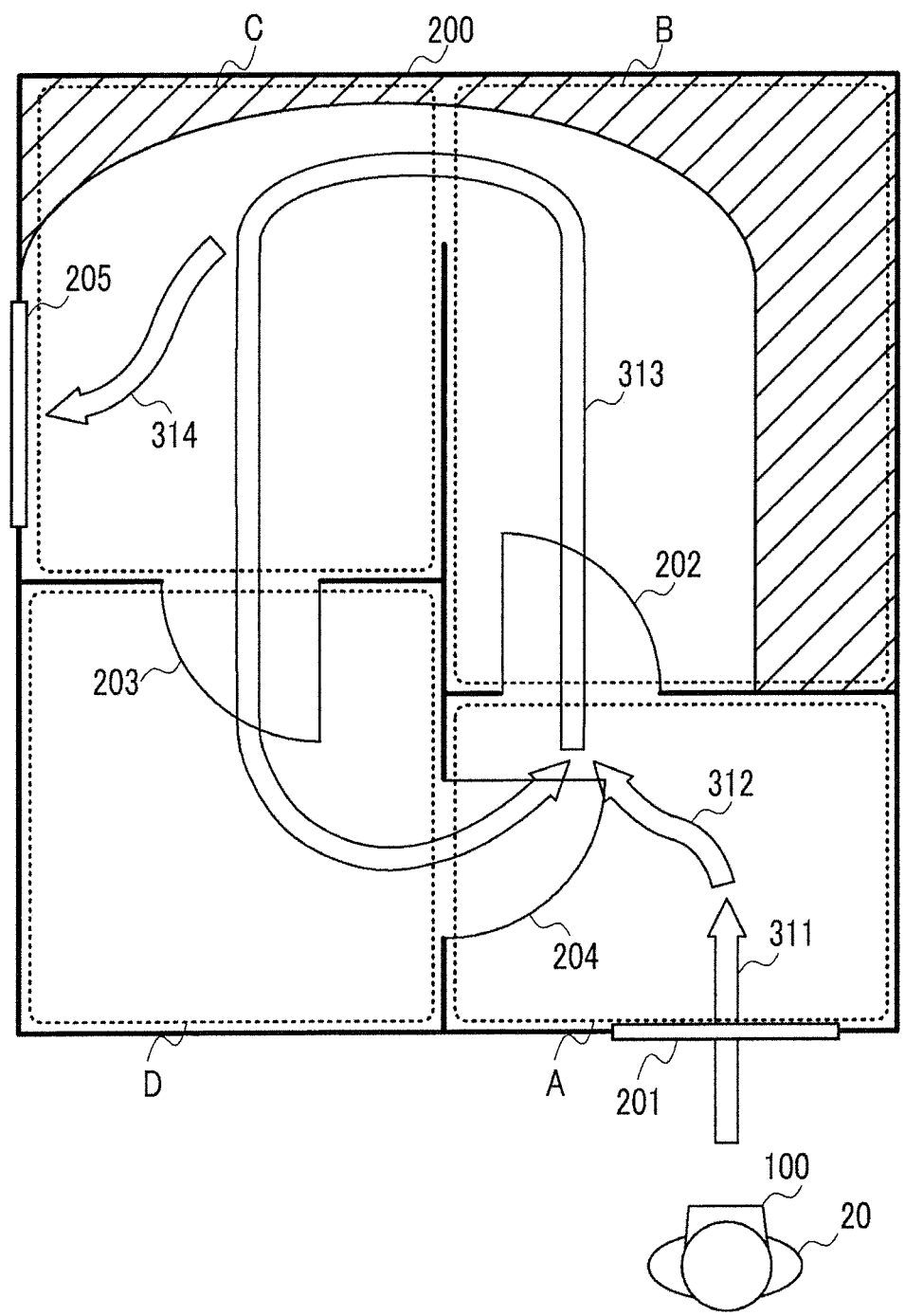
FIG. 3 is a plan view illustrating an example of an entertainment facility.

FIG. 1 is a block diagram illustrating a functional configuration of the display apparatus 100. FIG. 2 is a perspective view illustrating an example of the entertainment facility 200 in which the display apparatus 100 is used, and FIG. 3 is a plan view of the entertainment facility 200.

As illustrated in FIG. 1, the display apparatus 100 includes the display unit 110, the position information acquisition unit 120, an imaging unit 130, a storage unit 140, and a control unit 150. The display apparatus 100 is mounted on the head of the user 20 and is used, and is an apparatus called, generally, a head mounted display. The display apparatus 100 may be a wearable glasses type apparatus. As illustrated in FIG. 1, the display unit 110, the position information acquisition unit 120, the imaging unit 130, the storage unit 140, and the control unit 150 are connected to each other via a bus 160.

The display unit 110 is a display provided in the display apparatus 100, and displays a video delivered from the control unit 150. The user 20 enjoys the entertainment facility 200 on the basis of the video displayed on the display apparatus 100. The display apparatus 100 is configured to cover the peripheries of the eyes of the user 20, and thus the user 20 is in a state of being able to visually recognize only a video displayed on the display apparatus 100.

The position information acquisition unit 120 has a function of acquiring position information indicating the current position of the display apparatus 100. The position information acquisition unit 120 specifies a position by using, for example, an inside-out method of specifying a position or an attitude by scanning a surrounding environment with a camera or an infrared sensor attached to a head mounted display, or an outside-in method of acquiring a position or an attitude of a marker or a head mounted display by using a camera or an infrared irradiation device installed on a ceiling or a wall of a room. Alternatively, the position information acquisition unit 120 may acquire a position or an attitude of the head mounted display by using, for example, a GPS or an internal sensor. The position information acquisition unit 120 detects a position coordinate of the display apparatus 100 and an inclination (rotation information in three axes) thereof in the entertainment facility as position information, and delivers the position information to the control unit 150.

The imaging unit 130 is a camera that captures an image of the outside of the display apparatus 100, that is, the front side of the display apparatus 100 in a front direction of the user when the user 20 wears the display apparatus. The imaging unit 130 normally captures an image of the outside when the display apparatus 100 is driven.

The storage unit 140 is a storage medium having a function of storing various program and data required for an operation of the display apparatus 100. The storage unit 140 may be implemented by, for example, a hard disk drive (HDD), a solid state drive (SSD), or a flash memory. The storage unit 140 stores a number-of-times table 400 indicating the number of times for which a user has passed through each of a plurality of regions forming the entertainment facility, setting information for a user using the display apparatus 100, information indicating a positional range of each region forming the entertainment facility 200, various pieces of video data displayed on the display apparatus 100 or video data as sources thereof, and the like. Details of the number-of-times table 400 will be described later.

The control unit 150 is a processor having a function of executing the various programs stored in the storage unit 140 to control each unit of the display apparatus 100. The control unit 150 functions as a setting unit 151, a processing unit 152, a counting unit 153, and a generation unit 154 by executing the respective programs.

The setting unit 151 has a function of setting information regarding a user using the display apparatus 100. The setting unit 151 receives, for example, an ID of a user or the user's name from an external apparatus (for example, personal computer (PC)) connected to the display apparatus 100 in a wired or wireless manner, and stores information specifying a user to use the display apparatus 100 from now on in the storage unit 140.

The processing unit 152 has a function of processing an image captured by the imaging unit 130. The processing unit 152 extracts feature points from a captured image (for example, through edge detection, color analysis, or object analysis), and generates another image obtained by processing the captured image while leaving some of the feature points. For example, the processing unit 152 specifies a location (for example, a pathway) where the user 20 is walking from the captured image, does not process the pathway, and performs processing such that a wall of the pathway is distorted or a separate object is emerged from the wall. Alternatively, the processing unit 152 may generate a processed image in which the extent of processing increases as a distance from the user 20 increases toward a depth side of the captured image, that is, in a depth direction in terms of the user 20. The processing unit 152 processes a captured image by using any one of a plurality of predefined processing programs stored in the storage unit 140, or a plurality of programs. The processing unit 152 processes the captured image in response to an instruction from the generation unit 154, and delivers a processed image to the generation unit 154.

The counting unit 153 specifies a position of the display apparatus 100 in the entertainment facility 200 on the basis of position information sequentially delivered from the position information acquisition unit 120, and specifies a region including the position. The counting unit 153 increments the number of times of passage for which the user 20 wearing the display apparatus 100 has passed through the specified region, stored in the number-of-times table 400, by 1. The counting unit 153 does not perform increment for the same region until the user 20 moves to another region after the number of times of passage for the current region is incremented once.

The generation unit 154 has a function of generating a video to be displayed on the display unit 110. The generation unit 154 specifies the number of times for which the user 20 has passed through a region specified on the basis of the current position information of the user 20 (the current position information of the display apparatus 100) acquired by the position information acquisition unit 120, by referring to the number-of-times table 400 stored in the storage unit 140. A video which corresponds to the specified number of times and has not been presented to the user 20 until now is specified or generated. This may be realized by storing different pieces of video data corresponding to the number of times for which the user has passed through a region, or information correlated with identification information identifying the video data in the storage unit 140. When display of a processed image generated by the processing unit 152 is to be correlated in this correlation, the generation unit 154 instructs the processing unit 152 to process a captured image. The generation unit 154 displays a generated video or a processed image generated by the processing unit 152 on the display unit 110. The different pieces of video data may be completely different pieces of video data, and may be partially different pieces of video data. Preferably, even a slightly differing location is present in a video.

A video generated by the control unit 150 and displayed on the display unit 110 may be obtained by processing an image captured by the imaging unit 130, may be a video generated by the generation unit 154, may be a video obtained by combining an image captured by the imaging unit 130 with a video generated by the generation unit 154, and may be a combination thereof.

With the above-described configuration, the display apparatus 100 can provide different videos whenever the user 20 passes through the same region. Therefore, the user 20 can have different experiences any number of times while using the same entertainment facility 200, and can thus enjoy the entertainment facility 200 any number of times without getting bored.

As illustrated in FIGS. 2 and 3, the entertainment facility 200 is formed of a plurality of rooms. As illustrated in FIG. 3, the entertainment facility 200 is divided into a plurality of regions A to D, and the display apparatus 100 counts the number of times for which the user 20 has passed through each region. The user 20 wears the display apparatus 100, and enters the entertainment facility 200 through a door 201. The user 20 walks in the region A in directions indicated by arrows 311 and 312 according to an image displayed on the display apparatus 100. The user 20 enters the region B through a door 202. The user 20 passes through the region B, and enters the region C. The user 20 enters the region D through a door 203. The user 20 returns to the region A again through a door 204. The user 20 circulates the regions A to D as indicated by an arrow 313. If the user 20 circulates a predetermined number of times (for example, four times), or a predetermined time (for example, ten minutes) elapses, an exit 205 is displayed on the display unit 110 of the display apparatus 100, and the user 20 leaves the entertainment facility 200 as indicated by an arrow 314. As mentioned above, the user 20 circulates the inside of the entertainment facility 200, and thus passes through the same region many times. Whenever the user passes, the display apparatus 100 presents a video that has not been presented until then to the user 20. Therefore, the user 20 can view different videos even while passing through the same region (a location or a place) many times, and thus it is possible to provide the entertainment facility 200 enabling the user 20 not to get bored. With the configuration in which the same region is circulated, the entertainment facility 200 can be configured relatively compactly. Regarding a method of dividing the entertainment facility 200 into regions, a manager managing the entertainment facility may divide the entertainment facility according to any method. A shape of each region may not be a rectangular shape illustrated in FIG. 3, and may be, for example, an elliptical shape, or a shape corresponding to a shape of a room.

Data

Figure 4:
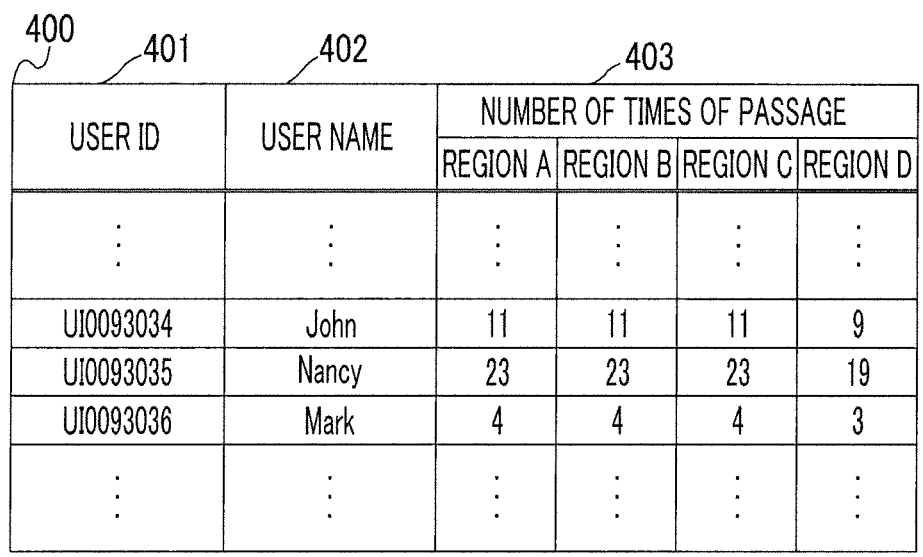
FIG. 4 is a data conceptual diagram illustrating a data configuration example of a number-of-times table.

FIG. 4 is a data conceptual diagram illustrating a data configuration example of the number-of-times table 400 stored in the storage unit 140. As illustrated in FIG. 4, the number-of-times table 400 is information in which a user ID 401, a user name 402, and the number of times of passage 403 are correlated with each other.

The user ID 401 is correlated with each of a plurality of users using the display apparatus 100, and is identification information identifying a user who can be uniquely specified.

The user name 402 is information indicating a name of a user corresponding to the user ID 401.

The number of times of passage 403 is information indicating the number of times for which the user corresponding to the user ID 401 and wearing the display apparatus 100 has passed each of the plurality of regions forming the entertainment facility 200. As described above, the number of times of passage 403 is incremented by the counting unit 153 when a corresponding user satisfies conditions.

According to the number-of-times table 400 illustrated in FIG. 4, it can be seen that a name of a user with a user ID "UI0093034" is "John," the number of times of having passed through the region A is "eleven times," the number of times of having passed through the region B is "eleven times," the number of times of having passed through the region C is "eleven times," and the number of times of having passed through the region D is "nine times."

Since the number-of-times table 400 is provided, the display apparatus 100 can specify the number of times for which a user has passed through each region on the basis of a user ID or a user name of the user using the display apparatus 100, set for the display apparatus 100, and can also increment the number of times for which the user has passed through each region.

Operation

Figure 5:
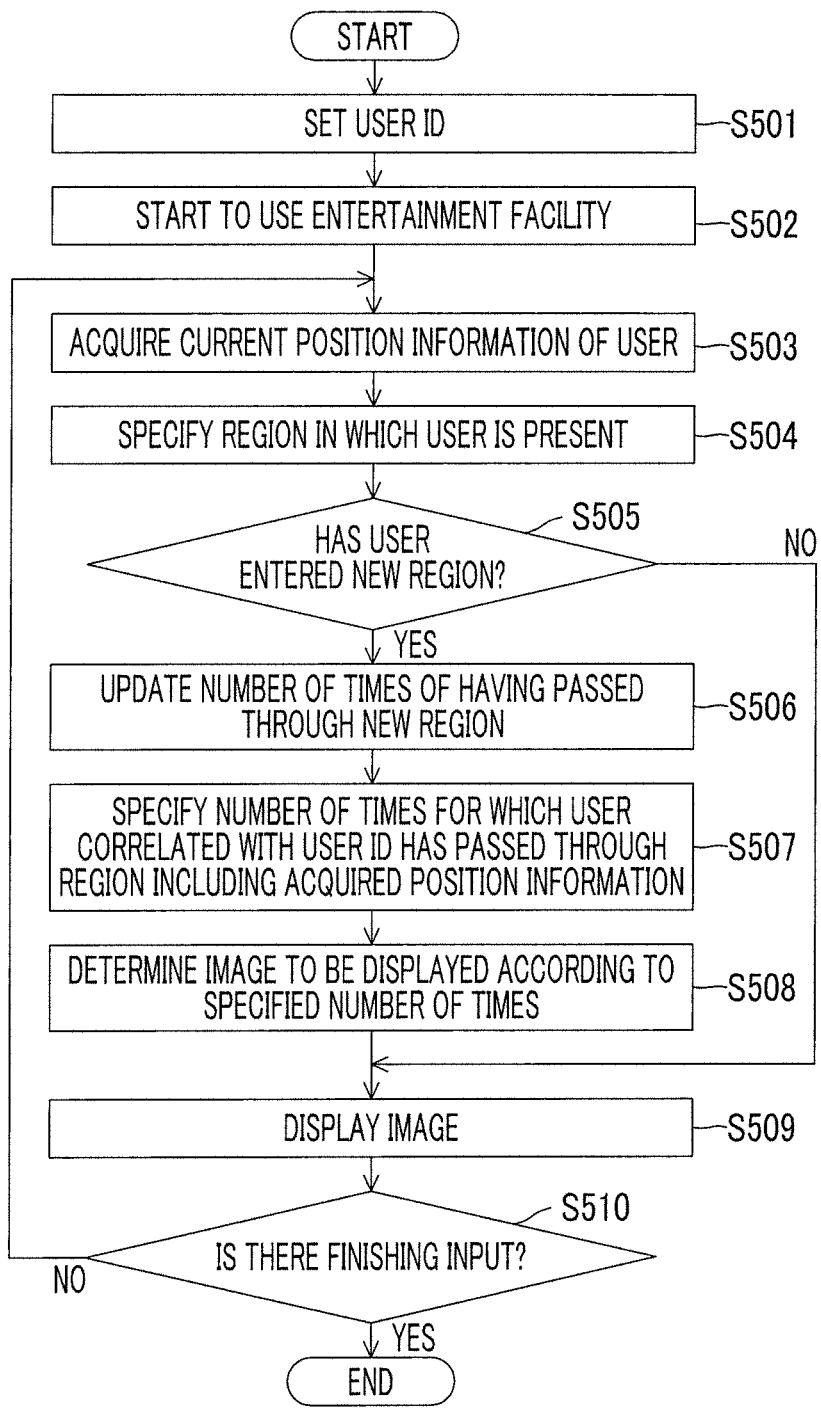
FIG. 5 is a flowchart illustrating an operation of the display apparatus.

FIG. 5 is a flowchart illustrating an operation of the display apparatus 100.

The setting unit 151 of the display apparatus 100 sets a user ID or a user name of a user to use the display apparatus 100 from now on in the storage unit 140 in response to an instruction from an external apparatus connected to the display apparatus 100 (step S501).

The user 20 wears the display apparatus 100, and starts to use the entertainment facility 200 (step S502). In other words, the user enters the entertainment facility 200 through the door 201.

If the user 20 has entered the entertainment facility 200, the position information acquisition unit 120 of the display apparatus 100 sequentially acquires the current position information of the display apparatus 100. The position information acquisition unit 120 delivers the acquired current position information to the control unit 150 (step S503).

The counting unit 153 of the control unit 150 specifies a region in which the user 20 wearing the display apparatus 100 is present on the basis of the delivered current position information and range information of each region stored in the storage unit 140 (step S504).

The control unit 150 determines whether or not the region in which the user is present is a new region (step S505). This determination is performed on the basis of whether or not a region in which the user is specified to be present previously is the same as a region in which the user is specified to be present this time. When it is determined that the user has entered the new region (YES in step S505), the flow proceeds to step S506, and, when it is determined the user has not entered the new region (NO in step S505), the flow proceeds to step S509.

The counting unit 153 updates the number-of-times table 400 stored in the storage unit 140 by incrementing the number of times corresponding to the region specified in step S504 by 1 in correlation with the user ID set in step S501 (step S506).

The generation unit 154 specifies the number of times of having passed through the region in which the user has stayed by referring to the number-of-times table 400 (step S507).

The control unit 150 displays the generated image on the display unit 110 (step S508).

The control unit 150 of the display apparatus 100 determines whether or not finishing input for the display apparatus 100 is received (step S510). When the finishing input is received (YES in step S510), the process is finished, and when the finishing input is not received (NO in step S510), the flow returns to step S503.

In the above-described way, the display apparatus 100 can provide different videos to the user 20 whenever the user passes through the same region. Therefore, it is possible to provide the entertainment facility 200 which enables the user 20 not to get bored.

Figure 6:
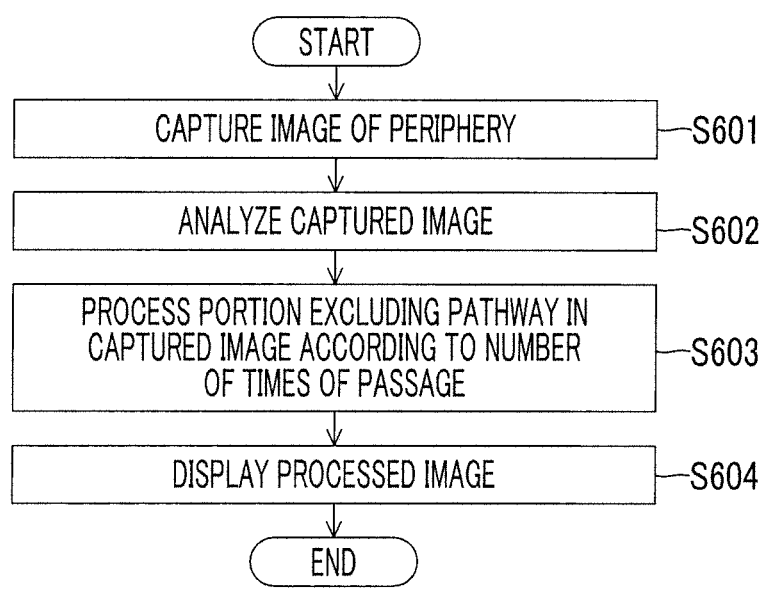
FIG. 6 is a flowchart illustrating an operation of the display apparatus.

FIG. 6 is a flowchart illustrating a processing operation performed by the processing unit 152.

The imaging unit 130 sequentially images the periphery, and delivers captured videos to the control unit 150 (step S601).

The processing unit 152 starts to generate a processed image in response to an instruction from the generation unit 154. The processing unit 152 analyzes the delivered videos to specify feature points thereof (step S602).

The processing unit 152 processes a portion excluding a pathway along which the user passes on the basis of the specified feature points according to the number of times of passing through a region to generate a processed image (step S603). The processing unit 152 delivers the generated processed image to the generation unit 154.

The generation unit 154 displays the delivered processed image on the display unit 110 (step S604).

As mentioned above, the display apparatus 100 captures an image in a direction in which a user views, processes the captured image which is then displayed, and can thus provide a video not boring the user 20.

Display Examples

Figure 7:
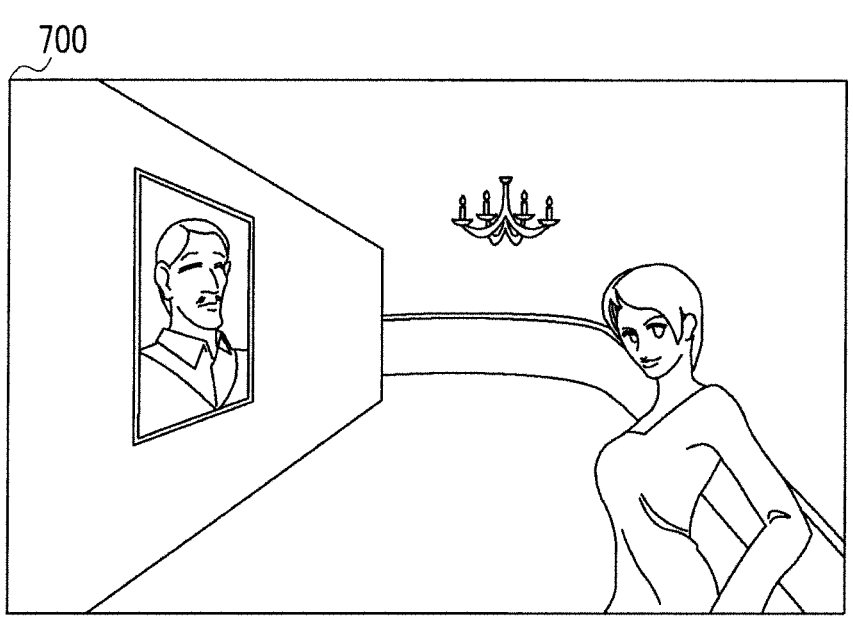
FIGS. 7(a) and 7(b) illustrate screen examples displayed on the display apparatus.
Figure 7:
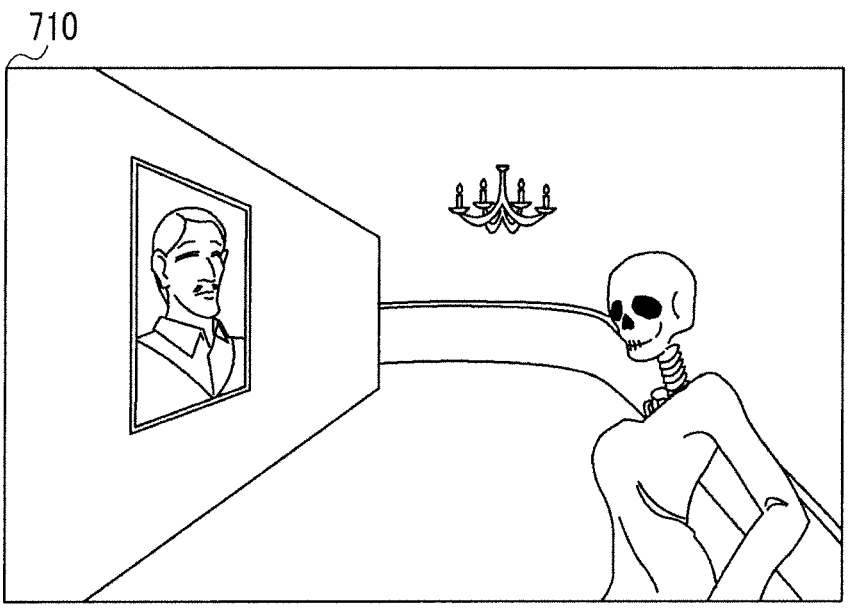

FIG. 7 illustrates image examples displayed on the display apparatus 100.

It is assumed that FIG. 7(a) illustrates, for example, an image of when the user 20 passes through the region B for the n-th time. As illustrated in FIG. 7(a), it is assumed that an image in which a woman stands on a corridor and guides the user is displayed on the display apparatus 100.

It is assumed that FIG. 7(b) illustrates an image of when the user 20 passes through the region B for the (n+1)-th time. As illustrated in FIG. 7(b), the woman is alive for the n-th time, but a state in which the woman is a skeleton is displayed for the (n+1)-th time, and this can startle the user 20.

As mentioned above, the display apparatus 100 provides different videos when a user passes through the same region. The examples illustrated in FIGS. 7(a) and 7(b) are only examples, and videos with various expressions may be provided to a user.

Figure 8:
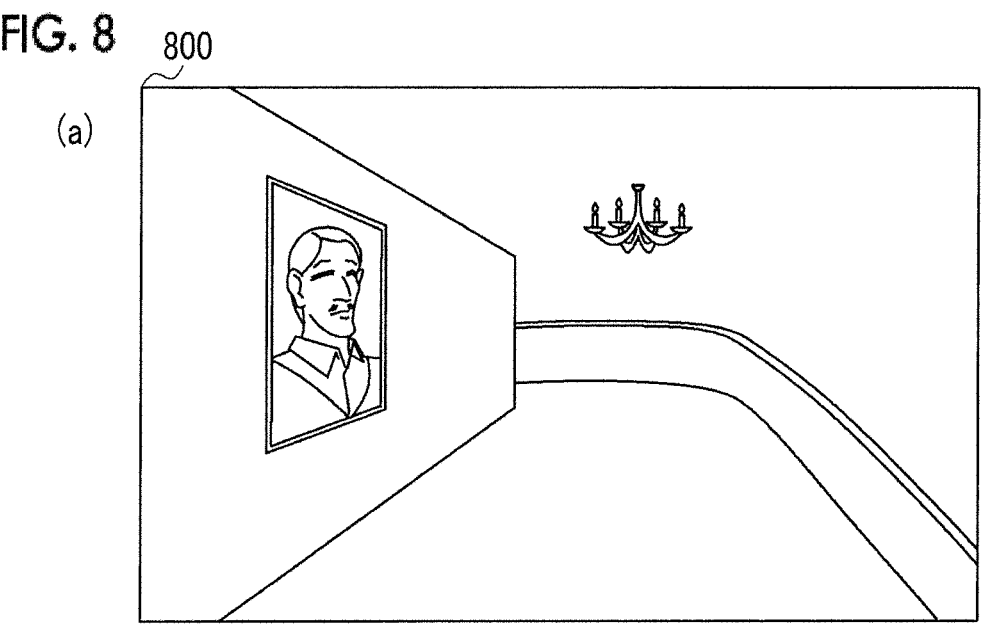
FIG. 8(a) illustrates an image example before being processed.
FIG. 8(b) illustrates an image example after being processed.
Figure 8:
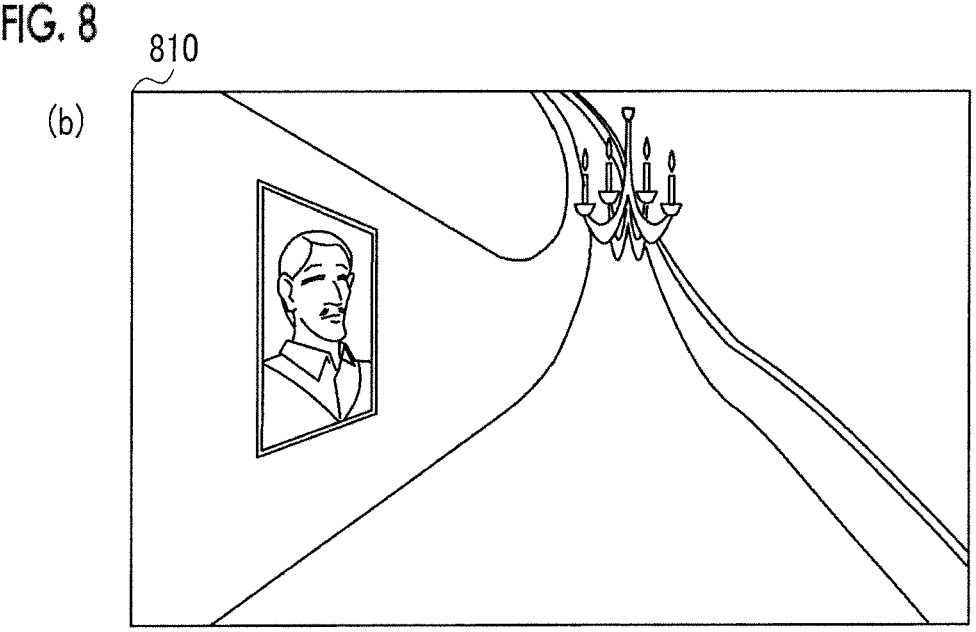

FIG. 8 is a diagram illustrating an example of processing a captured image in the processing unit 152 of the display apparatus 100. FIG. 8(a) illustrates an example of a captured image obtained by the imaging unit 130, and the captured image is an example of an image captured by the imaging unit 130 of the display apparatus 100 mounted on the user passing through the region B illustrated in FIG. 3.

In contrast, a processed image processed by the processing unit 152 is illustrated in FIG. 8(b). The processing unit 152 performs well-known image analysis on the captured image illustrated in FIG. 8(a) to extract feature points. The pathway portion is specified on the basis of the extracted feature points. Processing is performed on locations other than the specified pathway portion by using the origin image. For example, the processing unit 152 specifies a person from the captured image, and performs processing such that the person is emerged from an original place, or a wall or the like is distorted. In this case, as illustrated in FIG. 8(b), the extent of processing on the screen depth side may be heightened. The display apparatus 100 displays the processed image as illustrated in FIG. 8(b). The user views the image as illustrated in FIG. 8(b), and can thus feel as if the user stayed in a different space. The image examples illustrated in FIG. 7 or 8 are only examples.

Conclusion

As described above, the display apparatus 100 displays different videos according to the number of times for which a user has passed through a predetermined region. Therefore, amusement can be provided to the user every time by using different videos, and thus it is possible to provide an entertainment facility which the user can visit any number of times.

Example 2

In the above Example 1, some extent of facility is prepared in advance as illustrated in FIG. 2, but this is only an example. In Example 2, a description will be made of a method of obtaining the same effect as in Example 1 with a simpler facility. In Example 2, a description will also be made of a process in a case where a plurality of users enjoy an entertainment facility.

Configuration

Figure 9:
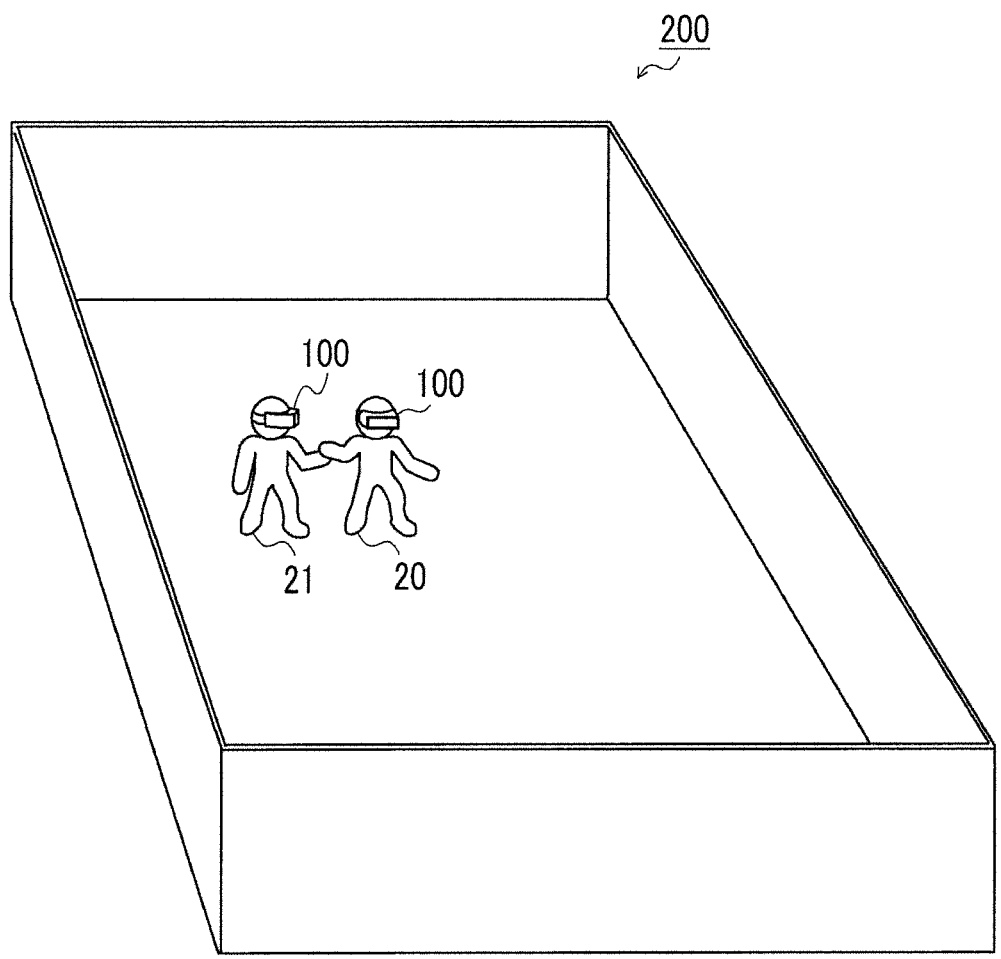
FIG. 9 is a perspective view illustrating an example of an entertainment facility.

FIG. 9 is a perspective view of an entertainment facility according to this example. As illustrated in FIG. 9, only a predetermined space is provided in the entertainment facility without preparing a wall or an item. Surfaces (a wall surface, a floor surface, and a ceiling surface) of the predetermined space are formed of wallpaper or cloth with a single color (for example, a blue back or a green back). The wall surface, the floor surface, and the ceiling surface may be coated with paint with a single color, and thus the predetermined space surrounded by the surfaces with the single color may be formed. The entertainment facility can be used by a plurality of users. Each user wears a head mounted display (HMD) as a display apparatus.

Figure 10:
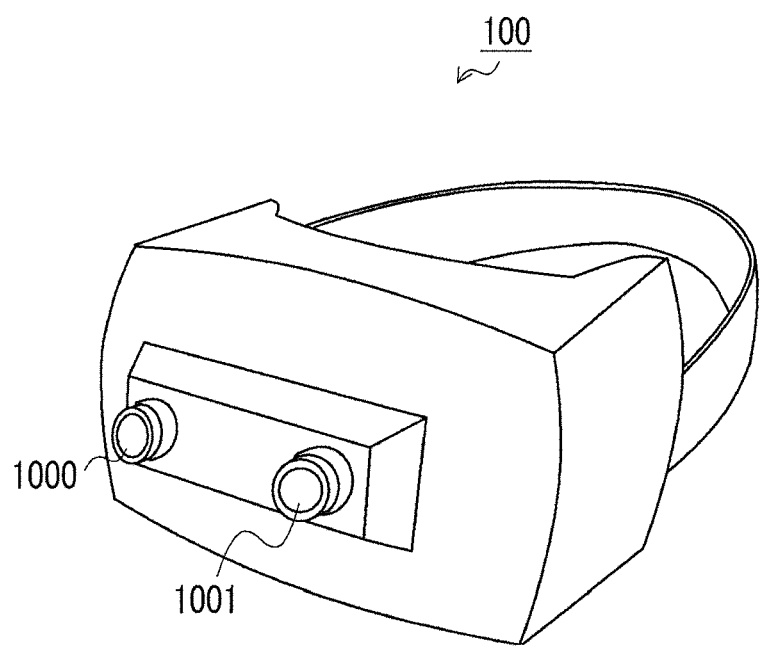
FIG. 10 is an exterior diagram illustrating an example of an exterior of the display apparatus.

As illustrated in FIG. 10, the HMD includes two imaging units such as an imaging unit 1000 and an imaging unit 1001 as the imaging unit 130. The imaging unit 1000 and the imaging unit 1001 are cameras respectively corresponding to the right eye and the left eye of a user wearing the display apparatus 100, and capture images in directed directions. A distance between the imaging unit 1000 and the imaging unit 1001 substantially corresponds to a sense between the eyes of the user. Consequently, an image captured by each of the imaging unit 1000 and the imaging unit 1001 is also used as a parallax image. The videos captured by the imaging unit 1000 and the imaging unit 1001 are delivered to the control unit 150.

In the predetermined space illustrated in FIG. 10, the position information acquisition unit 120 acquires a position and a direction of the display apparatus 100 in the predetermined space, and the generation unit 154 of the control unit 150 generates a video corresponding to the position and the direction, and displays the video on the display unit 110.

In this case, the control unit 150 specifies an imaged object other than the wall surface, the floor surface, and the ceiling surface on the basis of whether or not there are colors other than the single color of the peripheral surfaces in the videos acquired from the imaging unit 130 (the imaging unit 1000 and the imaging unit 1001). When it is detected that an object other than the peripheral surfaces is imaged, the processing unit 152 of the control unit 150 processes a captured image (video) of the object to match the displayed video of the periphery, and displays the processed image on the display unit 110. For example, if the video of the periphery displayed on the display unit 110 appears to be dark, processing is performed on the video of the imaged object such that the object appears to be present in a dark place, and the video is displayed.

For example, in the example illustrated in FIG. 9, the user 20 is included in an imaging range of the display apparatus 100 mounted on a user 21. Thus, the control unit 150 of the display apparatus 100 mounted on the user 21 performs processing on the user in a captured video such that the user 20 matches the video of the periphery, and displays the video on the display unit 110 of the display apparatus 100 mounted on the user 21.

In this case, the processing unit 152 calculates a distance to the object by using triangulation on the basis of a distance between the imaging unit 1000 and the imaging unit 1001, and a distance between corresponding pixels imaging the same object in captured videos obtained by both of the imaging units. The video is processed such that the object is displayed at the calculated distance.

Alternatively, processing may be performed in the same manner as when the display apparatus 100 mounted on the user 20 images the hands of the user 20, and the hand or the like of the user 20 may be displayed along with the video of the periphery. As described above, a distance to an object, that is, the hand of the user 20 can be calculated on the basis of a captured image, and thus it is possible to provide a video in which another object, for example, an insect crawls up the hand even if the hand of the user 20 is located at any position. As a video provided here, the video as described in Example 1 may be used. In other words, a user can enjoy with other users while providing different videos for each turn and also showing a video with a structure that the user loops in the video.

Operation

Figure 11:
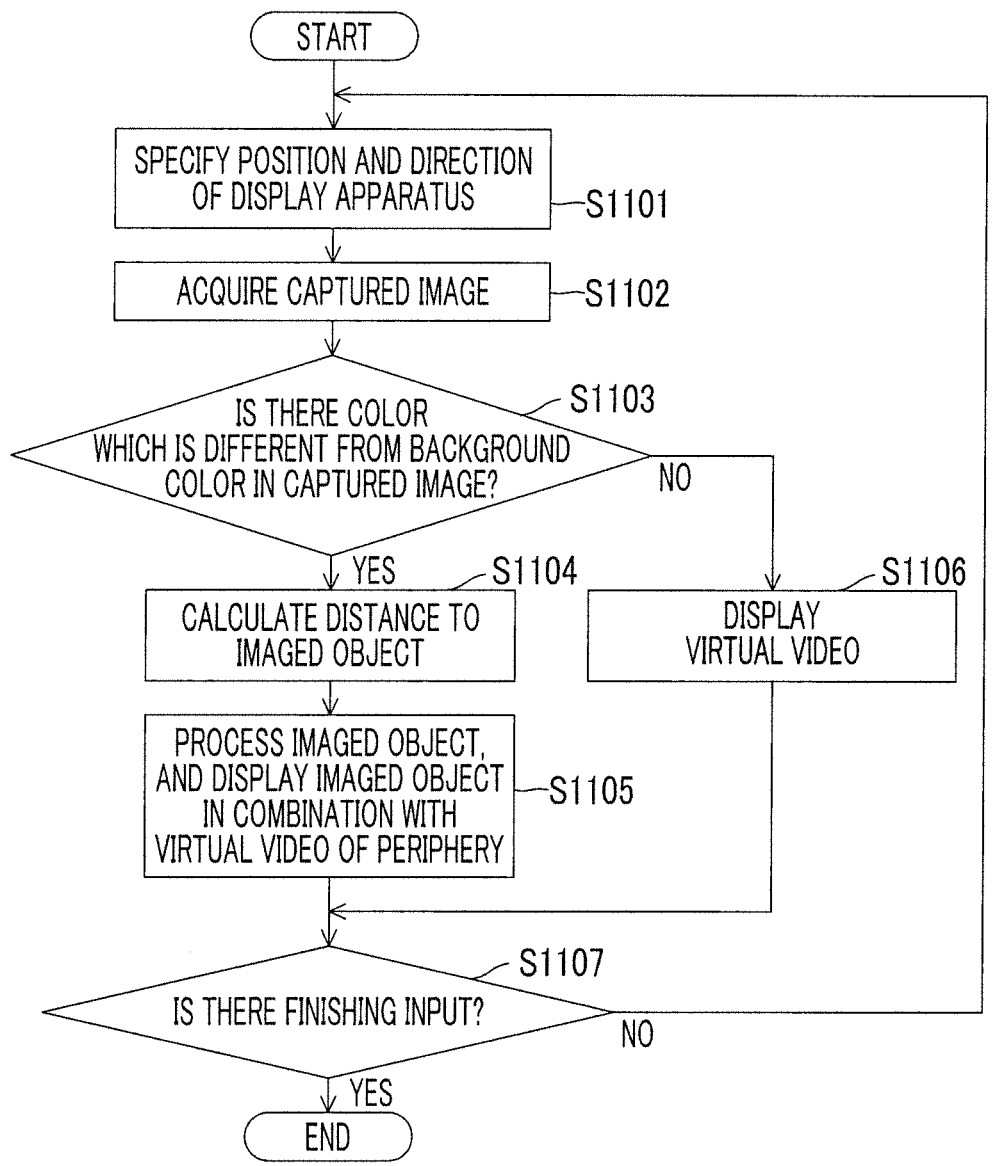
FIG. 11 is a flowchart illustrating an operation example of the display apparatus.

Hereinafter, a description will be made of an operation of the display apparatus 100 in Example 2. FIG. 11 is a flowchart illustrating an operation of the display apparatus 100 according to Example 2.

As illustrated in FIG. 11, the position information acquisition unit 120 acquires a position and a direction of the display apparatus 100 in the entertainment facility 200 (step S1101). This configuration may be realized by mounting, for example, a six-axis sensor or a nine-axis sensor on the display apparatus 100.

The imaging unit 130 (imaging units 1000 and 1001) sequentially acquires videos in directions in which the imaging units are provided and are directed (step S1102), and delivers the videos to the control unit 150.

The processing unit 152 of the control unit 150 determines whether or not a color which is different from a background color of a captured image, that is, the above-described single color is included in the captured image (step S1103). When a color different from the background color is included (YES in step S1103), the flow proceeds to a process in step S1104, and, if otherwise (NO in step S1103), the flow proceeds to a process in step S1106.

When a color different from a background color is included in the captured image, that is, when a certain object is imaged, the control unit 150 calculates a distance to the imaged object (for example, another user or the body of the user) by using triangulation (step S1104). The processing unit 152 processes the imaged object portion other than the background of the captured image to match a virtual video, combines the virtual video with a virtual video of the periphery, and displays the combined virtual video on the display unit 110 (step S1105).

On the other hand, when there is no color which is different from the background color in the captured image, that is, when any object other than the background is not imaged by the imaging units 1000 and 1001, the control unit 150 displays a virtual video on the display unit 110 (step S1106).

The control unit 150 determines whether or not finishing input is received from an operator of the entertainment facility (step S1107), finishes the process when there is the finishing input (YES in step S1107), and returns to step S1101 when there is no finishing input (NO in step S1107).

Through the above-described process, in the display apparatus 100, even if a plurality of users are present in a predetermined space, the users can share the same space, and can recognize that all of the users are present in a virtual space or can view the hands or feet thereof.

Conclusion

According to a video providing system including the display apparatus 100 according to Example 2, it is possible to provide a virtual reality space in which videos variously change without preparing a large-scaled apparatus. It is possible to provide a virtual reality space which can be simultaneously enjoyed by a plurality of users.

Appendixes

The apparatus according to the examples is not limited to those examples, and may be implemented according to other techniques. Hereinafter, various modification examples will be described.

Figure 12:
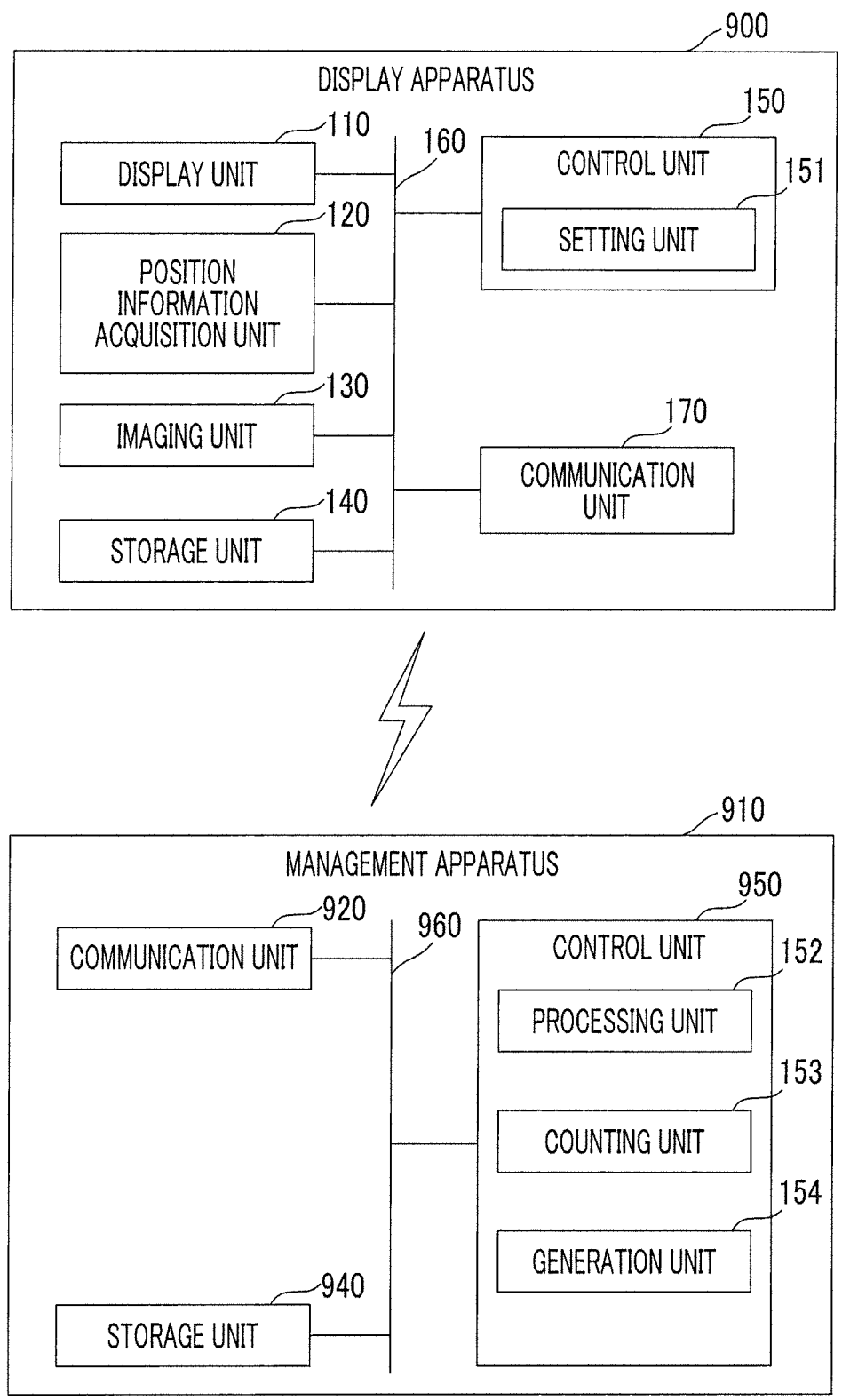
FIG. 12 is a block diagram illustrating a configuration example of an entertainment system.

(1) In the above Example 1, the display apparatus 100 is implemented by a single apparatus, but is not limited thereto. The functions executed by the display apparatus 100 may be realized by other apparatuses. For example, as illustrated in FIG. 12, the functions may be realized by a display apparatus 900 and a management apparatus 910, having some of the functions of the display apparatus 100 described in the examples. This configuration will be described briefly.

In an entertainment system illustrated in FIG. 12, the display apparatus 900 has a function of acquiring position information thereof, a function of capturing videos of the periphery, and a function of displaying videos, and the management apparatus 910 has a function of counting the number of times of having passed through a region and a function of generating videos on the basis of the number of times, which are functions of the display apparatus 100 in the embodiments.

As illustrated in FIG. 12, the display apparatus 900 includes a display unit 110, a position information acquisition unit 120, an imaging unit 130, a storage unit 140, a control unit 150, and a communication unit 170, and the functional units are connected to each other via a bus 160. The respective functional units of the display apparatus 900 are the same as the functional units described in the examples, and thus description thereof will be omitted. The control unit 150 functions as the setting unit 151, and does not function as a processing unit, a counting unit, and a generation unit other than that.

The communication unit 170 is a communication interface having a function of performing communication with other apparatuses. The communication unit 170 performs communication with the management apparatus 910 via wireless communication. The communication unit 170 may perform communication according to any communication protocol as long as communication with the management apparatus 910 can be performed. The communication unit 170 transmits a captured video obtained by the imaging unit 130 or the current position information acquired by the position information acquisition unit 120 to the management apparatus 910. The communication unit 170 receives video data transmitted from the management apparatus 910. The video data received by the communication unit 170 is displayed on the display unit 110.

On the other hand, the management apparatus 910 includes a communication unit 920, a storage unit 940, and a control unit 950. The communication unit 920, the storage unit 940, and the control unit 950 are connected to each other via a bus 960.

The communication unit 920 is a communication interface having a function of performing communication with other apparatuses. The communication unit 920 performs communication with the display apparatus 900 via wireless communication. The communication unit 920 may perform communication according to any communication protocol as long as communication with the display apparatus 900 can be performed. The communication unit 920 transmits video data delivered from the control unit 950 to the display apparatus 900. The communication unit 920 receives the current position information of the display apparatus 900 or a captured video from the display apparatus 900, and delivers the current position information or the captured video to the control unit 950.

The storage unit 940 is a storage medium having a function of storing various program and data required for an operation of the management apparatus 910. The storage unit 940 may be implemented by, for example, a hard disk drive (HDD), a solid state drive (SSD), or a flash memory. The storage unit 940 stores a number-of-times table 400 indicating the number of times for which a user has passed through each of a plurality of regions forming the entertainment facility, information indicating a positional range of each region forming the entertainment facility 200 and the like.

The control unit 950 is a processor having a function of executing the various programs stored in the storage unit 940 so as to control each unit of the management apparatus 910. The control unit 950 functions as a processing unit 152, a counting unit 153, and a generation unit 154 by executing the respective programs. The processing unit 152, the counting unit 153, and the generation unit 154 are the same as those described in the embodiments, and thus description thereof will be omitted.

With this configuration, the same effects as those in the configuration described in the embodiment can also be achieved. Since the management apparatus 910 has a function of generating a video, the display apparatus 900 is not required to have high performance of a processor, and thus it is possible to provide the cheap display apparatus 900. Since video data is not required to be stored in the storage unit 140 of the display apparatus 900, and thus a storage capacity of the storage unit 140 can be reduced. This configuration is also effective to Example 2.

(2) In the examples, a description has been made of an example in which the display apparatus 100 is used in the entertainment facility 200, but a place in which the display apparatus 100 is used is not limited to an entertainment facility. The display apparatus 100 may be used in a place in which a user passes through the same region many times even in other facilities or outdoor places.

(3) In the example, the display apparatus 100 has a GPS function, specifies a position thereof, and uses the specified position as information source to count the number of times of having passed through a region, but a method of counting the number of times of having passed through a region is not limited thereto. The user 20 may wear the display apparatus 100, and the number of times of having passed through each region may be counted, and the method of counting the number of times of having passed through a region may be realized according to other configurations. For example, a beacon generator generating a beacon at the center of each region is provided in the entertainment facility 200. The beacon is transmitted with signal intensity with which the beacon reaches each region but does not reach other regions. The beacon includes information indicating a region in which the beacon generator is placed. The display apparatus 100 has a communication function, and recognizes a region in which the display apparatus is present by receiving the beacon, and the counting unit 153 counts the number of times for which the user 20 has passed through the region.

Alternatively, there may be a configuration in which a camera that can image the entire region is provided in each region of the entertainment facility 200, image analysis is performed on an image captured by the camera such that the user 20 wearing the display apparatus 100 is specified, information indicating the specified user is transmitted to the display apparatus 100, and the counting unit 153 counts the number of times of having passed through each region. This configuration example is more suitable for when the management apparatus 910 described in the above appendix (1) performs counting than for a case where the display apparatus 100 performs counting.

(4) In the examples, a description has been made of a configuration in which a user passes through the same region many times by circulating the entertainment facility 200, but this can realize a configuration of providing different videos according to the number of times of passage as described in the examples, for example, even when the same user uses an entertainment facility with a single straight path many times.

(5) In the examples, the generation unit 154 generates a video corresponding to the number of times for which the user 20 wearing the display apparatus 100 has passed through a certain region and has not been presented to the user 20 until now. This is realized by correlating differing piece of video data with each number of times of passage in the above description, but this is only an example. For example, this may be realized by changing a program for generating a video instead of video data. When the display apparatus 100 has a configuration in which a plurality of different pieces of video data are prepared as video data, and one of the pieces of video data is selected at random, the same effect can also be achieved, that is, different videos can be provided to the user 20 whenever the user passes through the same region.

(6) In the examples, as the entertainment facility 200, a description has been made of an example of the entertainment facility 200 in which the user 20 moves on foot, but the entertainment facility 200 is not limited to a facility in which the user 20 moves on foot. The entertainment facility 200 may be a facility in which the user 20 moves by vehicle. In this case, the processing unit 152 may perform processing such that a pathway is distorted.

(7) In the examples, a description has been made of an example in which the single user 20 enjoys the entertainment facility 200, but the number of people enjoying the entertainment facility 200 at a time is not limited to one. A plurality of people may participate together, and, in this case, when the imaging unit 130 images another user, the display apparatus 100 may process a figure of the user and display the processed figure.

(8) The display apparatus 100 may have a communication function and, in this case, may have a function of collecting video data held therein, a generation program that generates videos, and a processing program that generates videos, and generating a new video by using each of the collected programs or video data.

(9) In the examples, although particularly described, a user may hold a controller for influencing a virtual video world. In this case, the controller may be provided with a sensor such that a position and a direction thereof in the entertainment facility 200 can be specified, and may influence a virtual video. For example, regarding the influence, a video may be processed such that the controller is regarded as a flashlight, and the flashlight illuminates the inside of a video world brightly according to a direction of the controller held by a user, and a video may be processed such that the controller is regarded as a gun, and, if the user pulls a trigger in a video world, shooting is performed in a direction in which the controller is directed. Here, a processing example of a video using the controller is only an example, and other processing may be performed, and the controller may be regarded as other objects.

Figure 13:
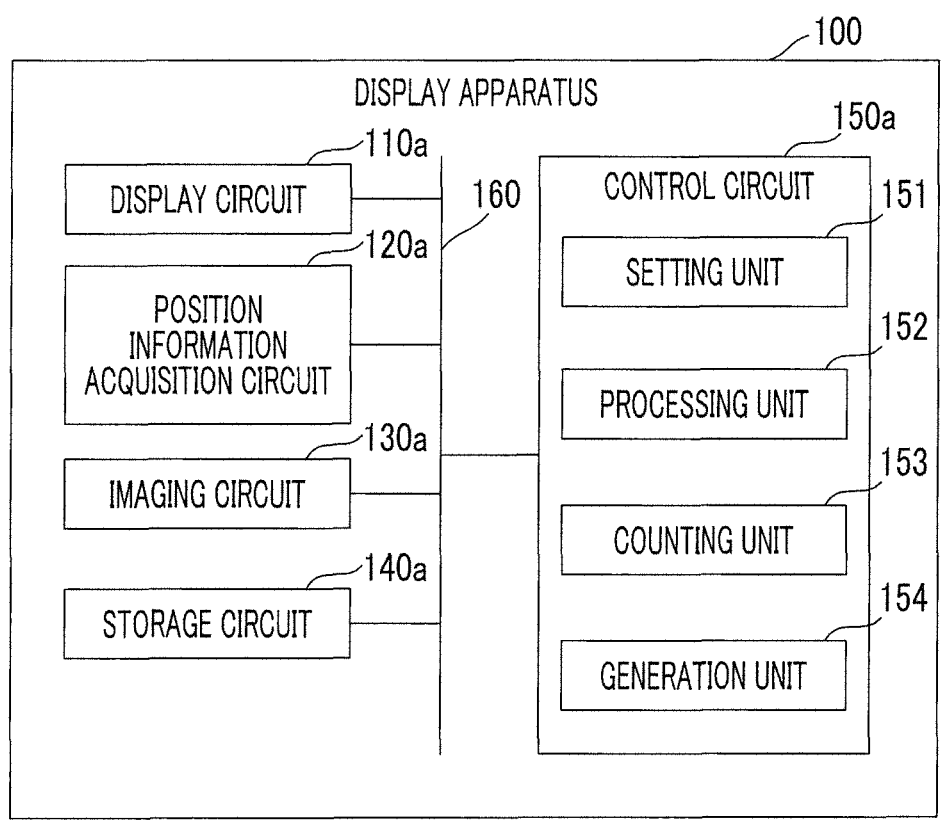
FIG. 13 is a block diagram illustrating a configuration example of the display apparatus.

(10) In the examples, a method of providing different videos in the display apparatus is realized by the processor of the display apparatus executing a video display program or the like, but may be realized by a logic circuit (hardware) or a dedicated circuit formed of an integrated circuit (IC) or a large scale integration (LSI) of the apparatus. Such a circuit may be realized by one or a plurality of integrated circuits, and the functions of the plurality of functional units described in the examples may be realized by a single integrated circuit. The LSI may be called a VLSI a super LSI, and an ultra LSI depending on a difference in the degree of integration. In other words, as illustrated in FIG. 13, the display apparatus 100 may be formed of a display circuit 110a, a position information acquisition circuit 120a, an imaging circuit 130a, a storage circuit 140a, and a control circuit 150a, and a function of each circuit is the same as that of each unit having the same name as that described in the examples.

The video display program may be recorded on a recording medium readable by the processor and, as the recording medium, a "non-transitory media," for example, a tape, a disc, a card, a semiconductor memory, and a programmable logic circuit may be used. The video display program may be supplied to the processor via any transmission medium (a communication network or a carrier) via which the video display program can be transmitted. My apparatus may be realized in the form of a data signal which is embodied through electronic transmission of the video display program and is embedded in a carrier.

The video display program may be installed by using a script language such as ActionScript or JavaScript (registered trademark), an object-oriented programming language such as Objective-C or Java (registered trademark), and a markup language such as HTML5.

(11) The examples and the various modification examples described in the appendixes may be combined with each other as appropriate.

The invention claimed is:

1. A video providing system comprising:
 a predetermined space surrounded by surfaces with a single color;
 a video display apparatus mounted on the head of a user, and includes two imaging devices disposed to be separated from each other by a gap corresponding to both of human eyes and perform image capturing in a front direction of the user when the user wears the video display apparatus; and
 a specifying device that specifies a position and a direction of the video display apparatus in the predetermined space,
 wherein the video display apparatus displays a video prepared in advance at a location where the single color is imaged by the two imaging devices, and displays a video based on videos captured by the two imaging devices at a location where the single color is not imaged, according to a direction and a position in the predetermined space.

2. The video providing system according to claim 1, further comprising:
 a calculation unit that calculates a distance to an imaged object other than the single color on the basis of videos captured by the two imaging devices; and
 a video generation unit that generates a stereoscopic video according to the distance calculated by the calculation unit,
 wherein the video display apparatus displays the stereoscopic video generated by the video generation unit.

3. The video providing system according to claim 2, wherein the video generation unit generates a video in which a differing object which is different from the object is superimposed on the object on the basis of the distance calculated by the calculation unit.

4. The video providing system according to claim 2, further comprising:
 a holding tool that applies an effect to a video displayed on the video display apparatus, and is held by a user, wherein the video generation unit generates a stereoscopic video to which the effect is applied according to a position and a direction of the holding tool.

5. A video providing method of providing a video to a video display apparatus mounted on the head of a user and used in a predetermined space surrounded by surfaces with a single color, and includes two imaging devices disposed to be separated from each other by a gap corresponding to both of human eyes and capture images in a front direction of the user when the user wears the video display apparatus, the method comprising:
 a specifying step of specifying a position and a direction of the video display apparatus in the predetermined space;
 imaging by performing image capturing in a front direction of the user with the two imaging devices; and
 a display step of displaying a video prepared in advance at a location where the single color is imaged by the two imaging devices, and displaying a video based on videos captured by the two imaging devices at a location where the single color is not imaged.

6. A video providing program for a video providing system providing a video to a video display apparatus mounted on the head of a user and used in a predetermined space surrounded by surfaces with a single color, and includes two imaging devices disposed to be separated from each other by a gap corresponding to both of the human eyes and capture images in a front direction of the user when the user wears the video display apparatus, the program causing a computer to realize:
 a specifying function of specifying a position and a direction of the video display apparatus in the predetermined space;
 an imaging function of performing image capturing in a front direction of the user with the two imaging devices; and
 a display function of displaying a video prepared in advance at a location where the single color is imaged by the two imaging devices, and displaying a video based on videos captured by the two imaging devices at a location where the single color is not imaged.

\* \* \* \* \*